US005979110A

United States Patent [19]
Tai

[11] Patent Number: 5,979,110
[45] Date of Patent: Nov. 9, 1999

[54] PLANT CLIP FOR POTTED PLANTS

[76] Inventor: Yu-Lin Tai, No. 45, Kaian 2nd St., Tainan, Taiwan

[21] Appl. No.: 09/094,432

[22] Filed: Jun. 8, 1998

[51] Int. Cl.[6] ................................................ A01G 5/00
[52] U.S. Cl. ......................... 47/41.01; 47/41.15; 24/339
[58] Field of Search .............................. 47/41.01, 41.15, 47/44, 47; 24/339, 336, 67.5, 557

[56] References Cited

U.S. PATENT DOCUMENTS

| | | | |
|---|---|---|---|
| 4,407,472 | 10/1983 | Beck | 24/339 X |
| 5,361,463 | 11/1994 | Kevis | 24/557 X |
| 5,542,209 | 8/1996 | Shen | 47/44 |

Primary Examiner—Michael J. Carone
Assistant Examiner—Jeffrey L. Gellner
Attorney, Agent, or Firm—Delett and Walters

[57] ABSTRACT

The present invention relates to a plant clip, and more particularly to a plant clip having a pair of mutually opposed arcuate plates, a band transversely and securely connected with each one of the arcuate plates, two reinforced ribs respectively formed on distal ends of the band and a pair of side wings integrally and respectively formed on distal ends of the respective reinforced ribs. A space is defined between an outer periphery of the arcuate plate and an inner face of the side wing. Therefore, a peduncle of a plant and a stick for providing support to the peduncle are able to be securely held by the plant clip via a space between the two arcuate plates and the space between the outer periphery of the arcuate plate and the inner face of the side wing.

14 Claims, 5 Drawing Sheets

PLANT CLIP FOR POTTED PLANTS

BACKGROUND OF THE INVENTION

1. Field of the Invention

The present invention relates to a plant clip, and more particularly to a plant clip which is able to evenly support the bud and peduncle of flowers or any other kinds of plants.

2. Background

It is well known in the art that when a flower bud begins to grow, due to the peduncle being soft and very vulnerable, a tenderer will use a stick which is axially tied up with the peduncle and wires which is loosely around the peduncle to support the flower to grow in a desired direction and manner. However, when the stick is used to straighten the peduncle, in order to secure the engagement between the stick and the peduncle, a user will have to use wires or any other suitable securing device to tie the stick and the peduncle together. As time goes by, the wires and/or the securing device will become rusty and the rusty surface of the securing device will impede the growth of the plant. Furthermore, due to the application of wires, the peduncle will not be able to have sufficient support in every parts and the tenderer will have to tender the plant in the aspect of providing sufficient support from time to time. Sometimes, the wire will even cut off the water transmission from the surface of the plant because of wrong engagement between the wires and the peduncle of the plant. It is noted that the stick-wire supporting manner applied the plant is not suitable and not satisfied to the needs of users, thus improvement and/or alternation thereof is necessary.

The present invention provides an improved plant clip to obviate and/or mitigate the aforementioned problems.

SUMMARY OF THE INVENTION

The primary object of the invention is to provide an improved plant clip which enables an user to provide suitable and even support to the growing peduncle, so that the plant is able to grow in a desired direction and manner.

Other novel features and advantages of the invention will become more apparent from the following detailed description when taken in conjunction with the accompanying drawings.

DETAILED DESCRIPTION OF THE PREFERRED EMBODIMENT

Figure 1:
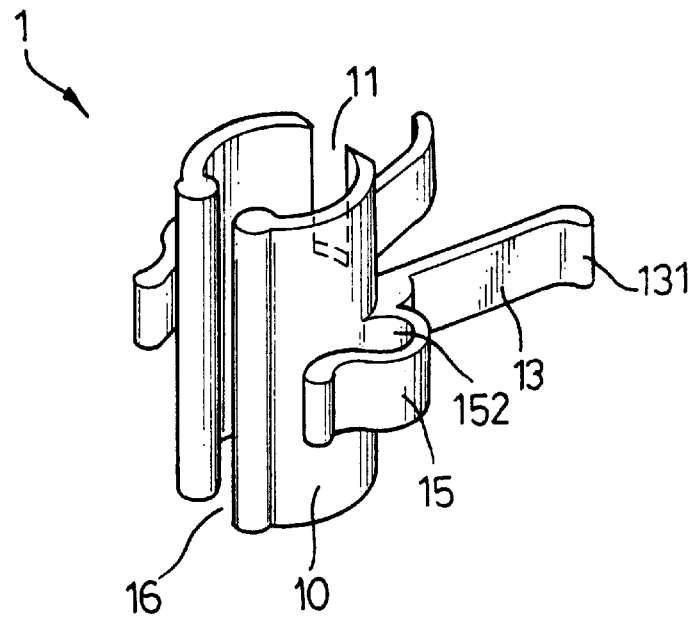
FIG. 1 is a perspective view of a first embodiment of a plant clip of the present invention.
Figure 2:
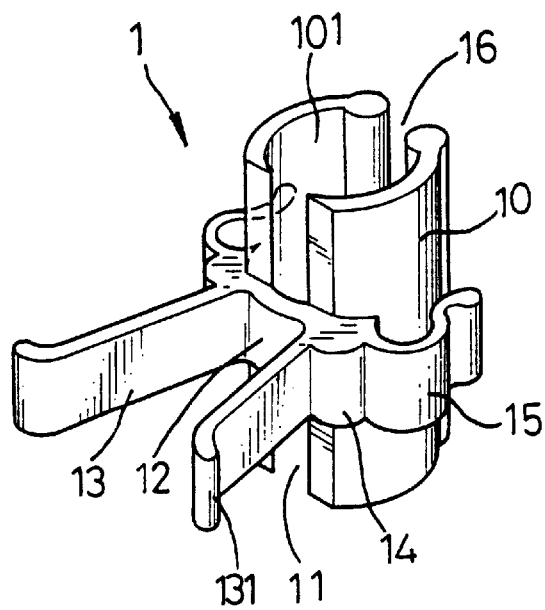
FIG. 2 is still a perspective view of the first embodiment of the plant clip of FIG. 1 shown in different angle.

Referring to FIGS. 1 and 2, it is noted that a plant stake 1 constructed in accordance with the present invention is shown. The plant clip 1 is made of resilient material, such as plastic, and has two opposed elongate and arcuate plates 10 each spaced apart from each other by a slot 11 defined therebetween, a band 12 securely and laterally connected with each one of the arcuate plates 10, a reinforced rib 14 integrally formed and extending from distal ends (not shown) of the band 12, a substantially S-shaped side wing 15 integrally and laterally extending from free ends (not shown) of the respective reinforced rib 14 and two presses 13 respectively and integrally formed on a juncture of the band 12 and the reinforced rib 14 and respectively extending in a direction opposite to a direction of the side wing 15. Opposed edges of each one of the two opposed arcuate plates 10 is defined to have an opening 16 relative to the slot 11, such that a peduncle of a flower is able to be received from the opening 16 and within a first space 101 defined between the two arcuate plates 10. Furthermore, each distal end of the presses 13 has a hook 131 formed thereon and a second space 152 is defined between an inner face of the respective side wing and an outer surface of each of the arcuate plates 10. The hook 131 is formed to facilitate holding of a user, such the user is able to open the opposed arcuate plates 10 by moving the respective presses 13 together.

Figure 3:
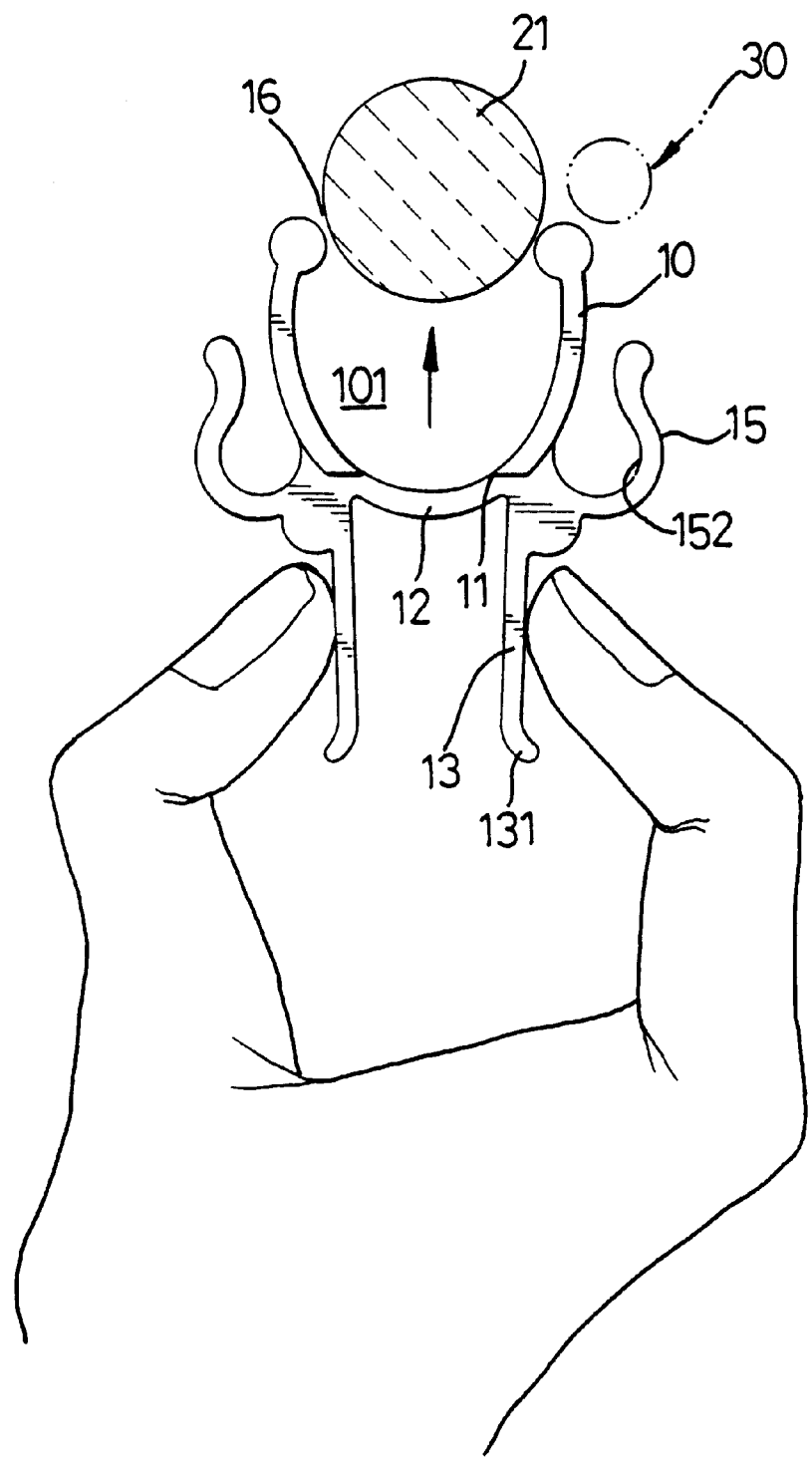
FIG. 3 is a schematic view showing the application of the present invention.
Figure 4:
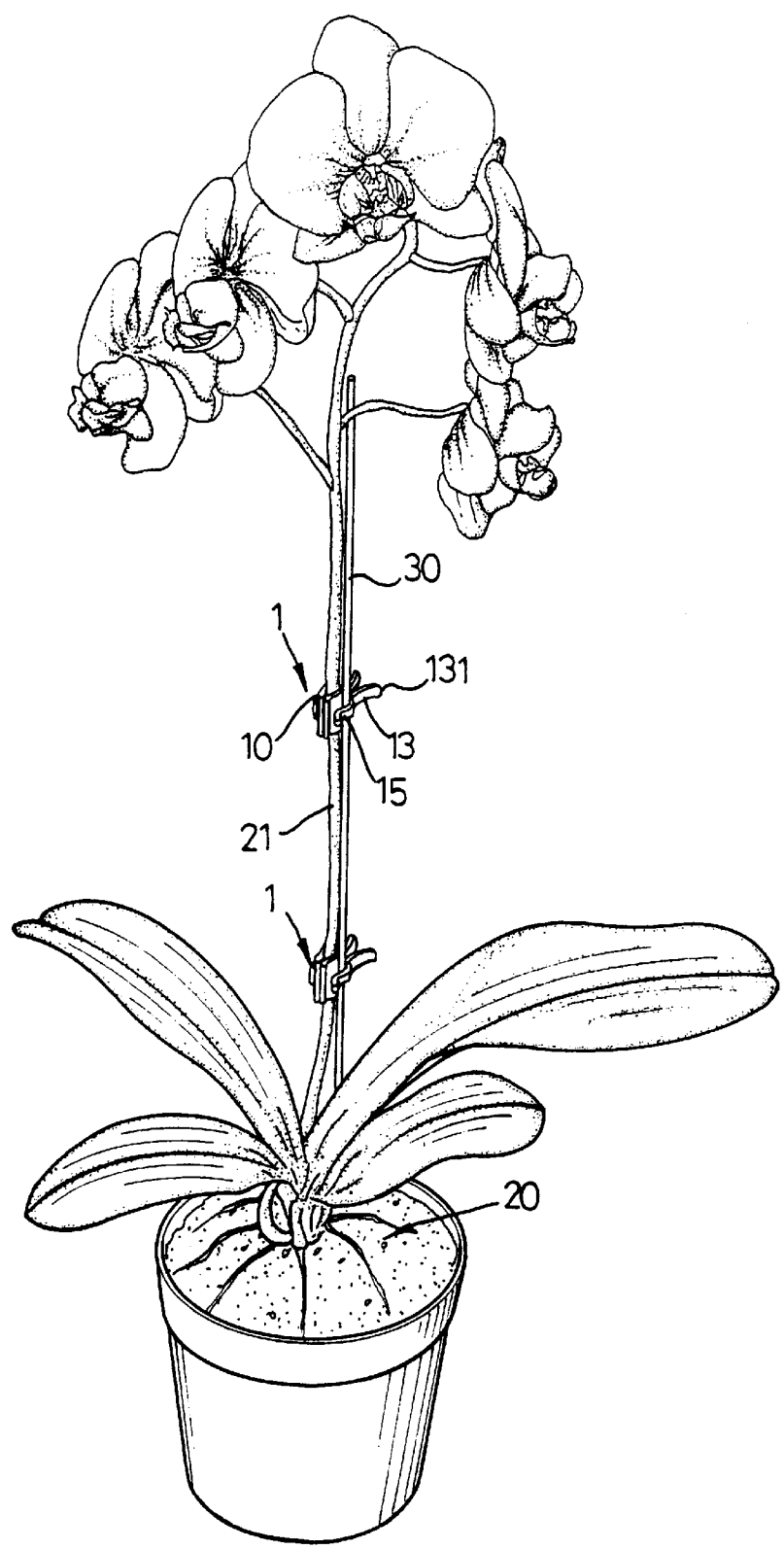
FIG. 4 is a schematic view showing the plant clip of the present invention being applied to a plant.

Referring to FIGS. 3 and 4, in application, a user is able to hold both of the presses 13 and force the presses 13 to move toward each other, the opening 16 between opposed edges of the respective arcuate plates 10 will be enlarged and thus a peduncle 21 of a plant 20 is able to be inserted via the enlarged opening 16 and securely received within the first space 101. A stick 30 used for providing support to the peduncle 21 is able to be received in the second space 152 of the side wing 15.

It is to be noted that the plant clip 1 as shown in FIGS. 1 to 4 may still have other alternations, in that once the technique of the present is revealed, different embodiments and/or alternations thereof may be easily accomplished. Therefore, the present invention further has two different embodiments as shown in FIGS. 5 and 6.

It is notable that the plant cilp 1 of the present invention has two second spaces 152 respectively defined adjacent each one of the arcuate plates 10 and surrounded by a portion of each of the side wing 15. To further enhance the utility of the invention, a plant clip 4 constructed in accordance with the present invent is shown in FIG. 5. The plant clip 4 has two opposed elongate and arcuate plates 40 each spaced apart from each other by a slot 41, a band 42 securely and laterally connected with each one of the arcuate plates 40, a reinforced rib 44 integrally formed and extending from distal ends (not shown) of the band 42, a substantially S-shaped side wing 45 integrally and laterally extending from free ends (not shown) of the respective reinforced rib 44 and two presses 43 respectively and integrally formed on a juncture of the band 42 and the reinforced rib 44 and respectively extending in a direction opposite to a direction of each one of the side wings 45. Furthermore, only one of the side wings 45 has an extension 46 extending in a direction the same as one of the presses 43, such that opening of the side wing 45 will be facilitated.

Figure 6:
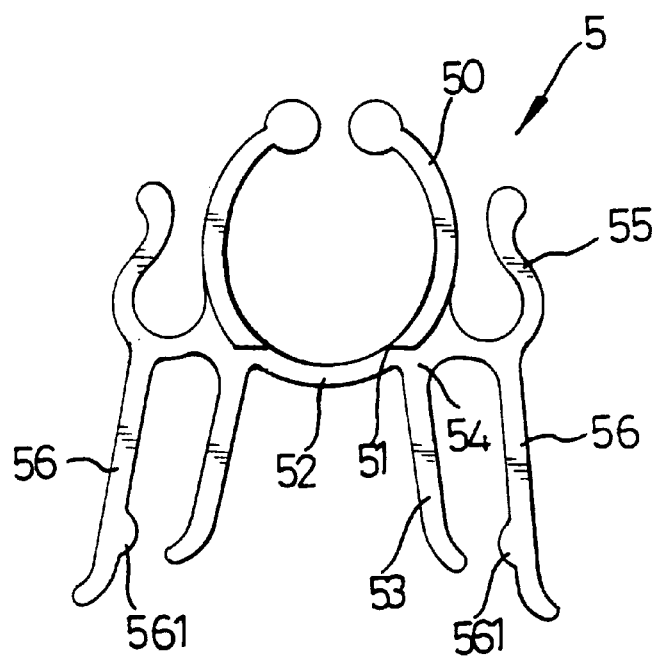
FIG. 6 is a side view showing a third embodiment of the present invention.

Referring to FIG. 6, another embodiment of the invention is shown. A plant clip 5 has two opposed elongate and arcuate plates 50 each spaced apart from each other by a slot 51, a band 52 securely and laterally connected with each one of the arcuate plates 50, a reinforced rib 54 integrally formed and extending from distal ends (not shown) of the band 52, a substantially S-shaped side wing 55 integrally and laterally extending from free ends (not shown) of the respective reinforced rib 54 and two presses 53 respectively and integrally formed on a juncture of the band 52 and the reinforced rib 54 and respectively extending in a direction opposite to a direction of each one of the side wings 55. Furthermore, both of the side wings 55 respectively have an extension 56 extending in a direction the same as one of the presses 53, such that opening of the side wing 55 relative to the arcuate plate 50 will be facilitated.

Figure 5:
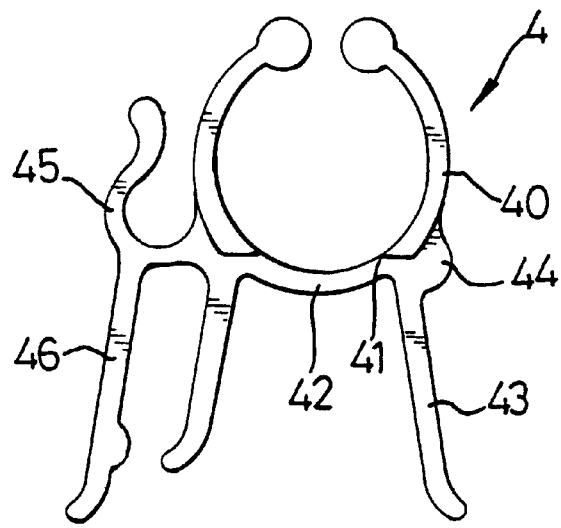
FIG. 5 is a side view showing a second embodiment of the present invention.

It is notable that both of the embodiments of the plant clips 40, 50 respectively shown in FIGS. 5 and 6 have a boss 461, 561 integrally formed with the side wings 46, 56, such that when the side wings 46, 56 are opened, the boss 461, 561 will come into engagement with a free end of the presses 43, 53 to prevent the extensions 46, 56 from broken.

Figure 7:
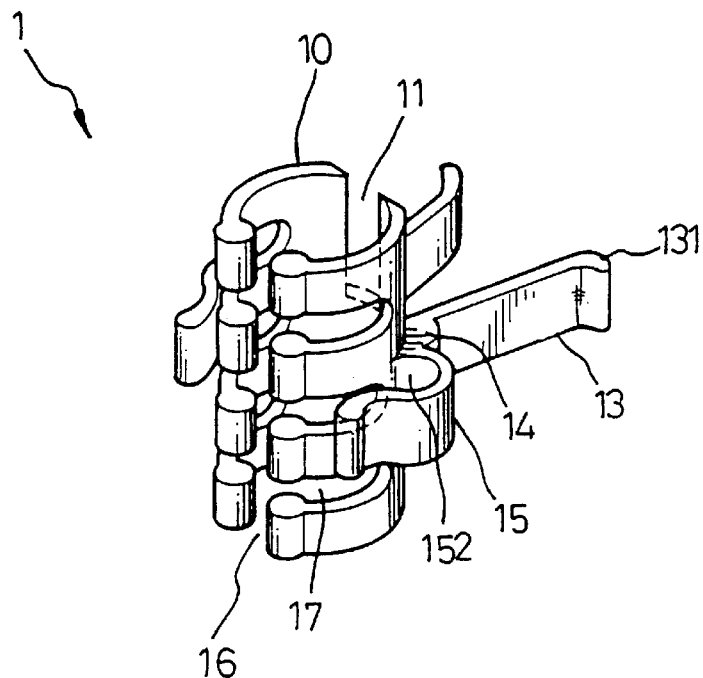
FIG. 7 is a perspective view showing another preferred embodiment of the present invention.

A further preferred embodiment of the present invention is shown in FIG. 7. The plant clip of the invention has a plurality of transversely defined cutouts 17 defined in the both of the arcuate plates 10, such that when the peduncle of a plant is not smooth in the surface thereof and has a plurality of axillary buds formed thereon, the plant clip of the invention can still hold the plant in position and provide sufficient support thereto.

Figure 8:
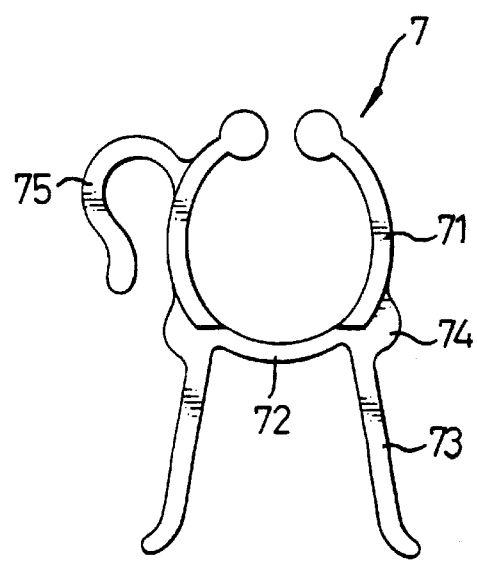
FIG. 8 is a plan view showing still another preferred embodiment of the invention.

Still another preferred embodiment of the invention is shown in FIG. 8, wherein the plant clip 7 of the invention has two opposed elongate and arcuate plates 71, a band 72 securely and laterally connected with each one of the arcuate plates 71, a reinforced rib 74 integrally formed and extending from distal ends (not shown) of the band 72, a side wing 75 integrally and laterally extending from one of the arcuate plates 71 and two presses 73 respectively and integrally formed on a juncture of the band 72 and the reinforced rib 14 and respectively extending in a direction the same as a direction of the side wing 75.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A plant clip comprising:

two opposed arcuate plates each spaced apart from each other;

a band securely and laterally connected with each one of the arcuate plates;

two reinforced ribs integrally formed and extending from distal ends of the band;

two side wings integrally and laterally extending from the free ends of the respective reinforced rib; and two presses respectively and integrally formed on the respective junctures of the band and the reinforced ribs and respectively extending in a direction opposite to a direction of the side wing.

2. The plant clip as claimed in claim 1, wherein the side wing is S shaped.

3. The plant clip as claimed in claim 1, wherein a slot (11) is defined between the two arcuate plates (10).

4. The plant clip as claimed in claim 1 further having a plurality of lateral cutouts (17) defined in each one of the two plates.

5. The plant clip as claimed in claim 1, wherein an extension is orientated in a direction the same as one of the presses.

6. The plant clip as claimed in claim 1, wherein each press has an extension orientated in a direction the same as the press.

7. The plant clip as claimed in claim 5, wherein a boss is integrally formed on the extension and corresponds to a distal end of one of the presses.

8. The plant clip as claimed in claim 6, wherein a boss is integrally formed on each one of the extensions and corresponds to a distal end of the respective presses.

9. A plant clip comprising:

two opposed arcuate plates each spaced apart from each other;

a band securely and laterally connected with each one of the arcuate plates;

two reinforced ribs respectively extending from distal ends of the band;

a side wing integrally formed and laterally extending from one of the arcuate plates; and two presses respectively and integrally formed on a juncture of the band and the reinforced rib and respectively extending in a direction opposite to a direction of the side wing.

10. The plant clip as claimed in claim 9 further having a plurality of lateral cutouts (17) defined in each one of the two arcuate plates.

11. The plant clip as claimed in claim 9, wherein an extension integrally extends in a direction the same as one of the presses.

12. The plant clip as claimed in claim 9, wherein each press respectively has an extension oriented in a direction the same as the respective press.

13. The plant clip as claimed in claim 11, wherein a boss is integrally formed on the extension and corresponds to a distal end of one of the presses.

14. The plant clip as claimed in claim 12, wherein a boss is integrally formed on each one of the extensions and corresponds to a distal end of the respective presses.

* * * * *